(12) United States Patent
Hansson et al.

(10) Patent No.: US 9,426,286 B2
(45) Date of Patent: Aug. 23, 2016

(54) CALL-BACK FUNCTION

(71) Applicant: Opticaller Software AB, Gothenburg (SE)

(72) Inventors: Mattias Hansson, Gothenburg (SE); Jorgen Steijer, Alvsjo (SE); Felix Wallen, Skarholmen (SE); Shitian Long, Sollentuna (SE)

(73) Assignee: INNOTEL AB, Gotebord (SE)

( * ) Notice: Subject to any disclaimer, the term of this patent is extended or adjusted under 35 U.S.C. 154(b) by 0 days.

(21) Appl. No.: 14/436,437

(22) PCT Filed: Oct. 9, 2013

(86) PCT No.: PCT/SE2013/051183
§ 371 (c)(1),
(2) Date: Apr. 16, 2015

(87) PCT Pub. No.: WO2014/062117
PCT Pub. Date: Apr. 24, 2014

(65) Prior Publication Data
US 2015/0256673 A1      Sep. 10, 2015

(30) Foreign Application Priority Data

Oct. 16, 2012 (SE) ........................ 1251167

(51) Int. Cl.
*H04M 3/42* (2006.01)
*H04W 92/02* (2009.01)

(52) U.S. Cl.
CPC ........ *H04M 3/42195* (2013.01); *H04M 3/4234* (2013.01); *H04M 3/42059* (2013.01); *H04W 92/02* (2013.01)

(58) Field of Classification Search
CPC .......... H04M 3/42059; H04M 3/4234; H04M 3/42195; H04W 92/02
USPC ........................................... 455/415
See application file for complete search history.

(56) References Cited

U.S. PATENT DOCUMENTS

| | | | |
|---|---|---|---|
| 8,107,609 | B2 | 1/2012 | Trandal et al. |
| 8,532,274 | B2 | 9/2013 | Caipa et al. |
| 2002/0025030 | A1 | 2/2002 | Kim |
| 2005/0195802 | A1 | 9/2005 | Klein et al. |

FOREIGN PATENT DOCUMENTS

| | | |
|---|---|---|
| EP | 2268093 | 12/2010 |
| WO | 2006039552 | 4/2006 |
| WO | 2011159237 | 12/2011 |

*Primary Examiner* — Charles Shedrick
(74) *Attorney, Agent, or Firm* — Park, Vaughan, Fleming & Dowler LLP

(57) ABSTRACT

A user of a user terminal (10), is a first party (FP) associated with a communication handling device (14). The user terminal receives a selection of a second party (SP) the first party desires to contact, investigates if an association exists between a first access number of the communication handling device and the second party, and if so selects the first access number and attempts to set up a call from the user terminal to the communication handling device (14), then disrupts the call and receives a return call from the communication handling device. The communication handling device receives the attempt, determines if it comprises a calling party identifier, and if so disables the call, locates the second party using the first access number and calling party identifier, sets up the return call to the user terminal, sets up a call to the second party terminal (15) and interconnects these.

14 Claims, 4 Drawing Sheets

CALL-BACK FUNCTION

FIELD OF THE INVENTION

The present invention generally relates to telecommunication. More particularly the present invention relates to a method and computer program product for enabling the setting up of telephone calls for a user of a user terminal, a user terminal, a method and a computer program product for setting up telephone calls for a user as well as to a communication handling device for such call set-up.

BACKGROUND

Many efforts are made to reduce the cost of phone calls.

One way to reduce costs is through the use of calling cards. These do however require quite a lot of user input. U.S. Pat. No. 7,346,156 describes one way in which the user input can be reduced. This is done through detecting an identity of a caller, receiving an assigned incoming telephone number, identifying a recipient associated with the assigned incoming telephone number and the identity and connecting the caller and the recipient. There is in this regard still a lot of effort required due to the fact that calling cards are used.

With regard to cellular phones another way to reduce costs is through associating the cellular phone with a communication handling device, such as a private branch exchange of a company, and thereafter using call-back to connect to other entities.

A system having this purpose is for instance described in EP 1847104. Here a connection is set up via a call back procedure. According to this document a data message is sent from the cellular phone to a call setup device, which orders a communication handling device in the form of a private branch exchange to set up one connection to the mobile phone and another connection to an entity the user of the phone wants to call. These connections are then interconnected in the private branch exchange.

In this way it is then possible for the user to make calls, without the cellular phone being billed or being billed only for the data traffic, which is in some cases negligible.

There may be several reasons for the cellular phone not being desired to be billed, where one may be that the phone is the private property of the user, which user is employed by a company. The costs of the call, which may be a business call, should then be borne by the company and not the user. This is often automatically done if a private branch exchange of the company is used for the call-set up.

However, there are situations where also small amounts of data traffic are fairly expensive. This is typically the case when the cellular phone is roaming in another network than the one to which it belongs, for instance when being used abroad.

There is therefore a need for an alternative call-back scheme that does not have to rely on data traffic for initiating the call-back procedure.

The invention is therefore directed towards providing an alternative way to initiate a call-back procedure between a cellular phone and a communication handling device.

SUMMARY OF THE INVENTION

The present invention addresses this situation. The invention is thus directed towards improving the use of a user terminal in relation to a communication handling device. This object is solved through the independent claims 1, 7, 8, 9, 13 and 14.

The invention has a number of advantages. It allows a user terminal to use the call-back functionality of a communication handling device without initiating the procedure with data messages. This lowers the costs of the user terminal, especially in roaming situations. This can also be done while hiding the activities for the user and thereby the functionality is easy to use for the user.

BRIEF DESCRIPTION OF THE DRAWINGS

The present invention will in the following be described with reference being made to the accompanying drawings, where FIG. 1 schematically shows a user terminal connected to a communication handling device via a first and a second communication network.

DETAILED DESCRIPTION OF THE INVENTION

In the following, embodiments of the invention providing connection of a user terminal to a communication handling device will be described.

The invention is directed towards user activities such as setting up of telephone calls in relation to a user terminal.

Figure 1:
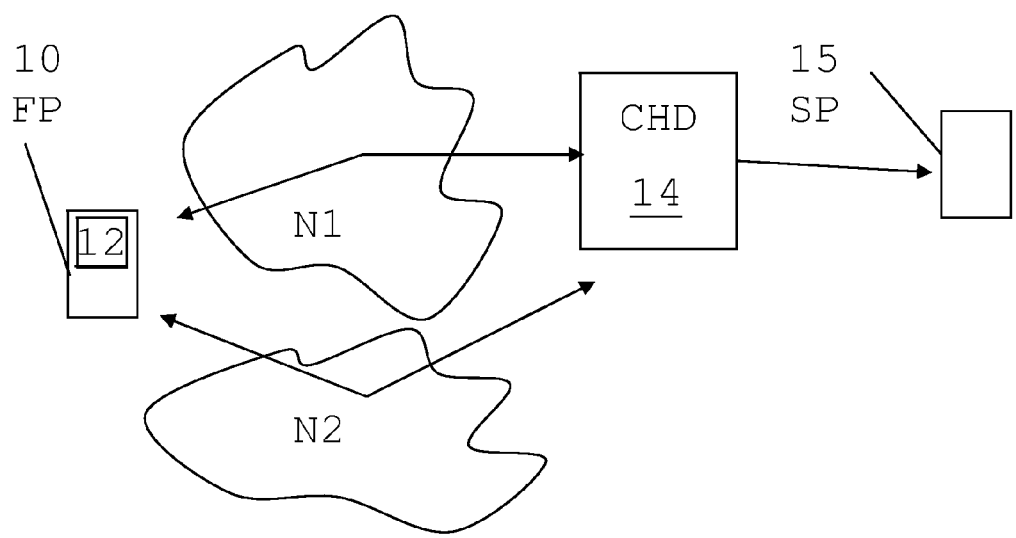

FIG. 1 schematically shows a user terminal 10 having a display 12 and being connected to a communication handling device CHD 14 via a first communication network N1, which may be a cellular network, as well as via a second network N2, which may be a computer communication network such as Wireless Local Area Network (WLAN) or WiFi network. The connection with the communication handling device 14 in the first network N1 is normally a voice connection. The communication handling device 14 is a device handling communication for a number of terminals. It can in some variations of the invention be a device provided by an operator for setting up international calls. It can also be an exchange, like a private branch exchange (PBX). In the case of a private branch exchange there may be terminals associated with this exchange. Such terminals can have a strong connection to the exchange and be for instance extensions that can only communicate via the exchange or have a loose connection, where they may have the capability to operate independently of the exchange, i.e. to make calls independently of the exchange.

According to the invention the user terminal 10 is of the latter type. The user terminal 10 can also be considered to be a terminal having a remote connection to the communication handling device 14. The user terminal 10 may typically be a cellular phone, i.e. a mobile phone, or a device having mobile phone functionality. It should also be realized that the communication handling device 14 is normally not a part of the first communication network N1, but from the standpoint of the operator of the first communication network N1 may be considered to be another "user" terminal using the network resources of the network operator. In FIG. 1 the communication handling device 14 is shown as providing communication with the user terminal 10, which forms a first party FP and with a second user terminal 15, which forms a second party SP. It should be realized that the connection with the second party SP may be made via the first communication network N1 or another network, such as a POTS network.

The communication handling device 14 can include the functionality of a call set up device with private branch exchange (PBX) as described in EP 1847104, which is herein incorporated by reference.

Figure 2:
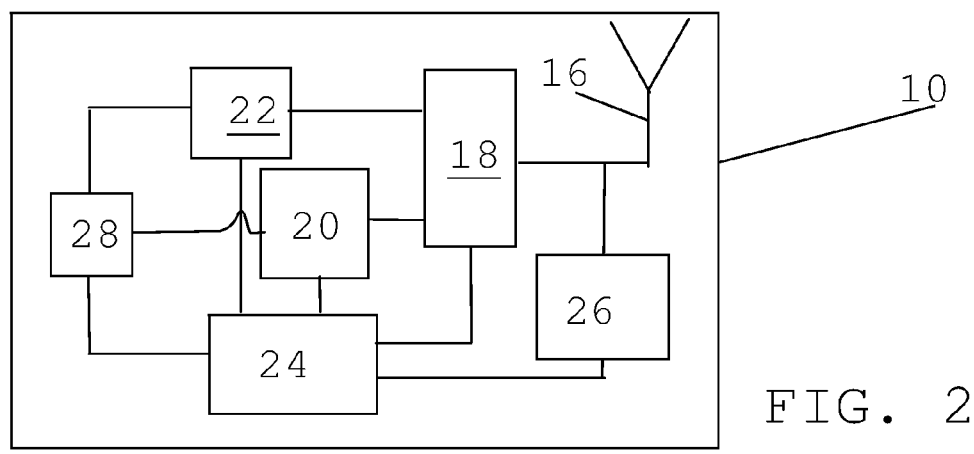
FIG. 2 shows a block schematic of units in the user terminal, FIG. 3 schematically shows content of a contacts memory in the user terminal.

FIG. 2 shows a block schematic of some of the elements of the user terminal 10. It includes a wireless interface in the form of an antenna 16 connected to a first radio communication circuit 18. This first radio communication circuit 18 is adapted for communication using a suitable wireless communication technology such as GSM, GPRS, WCDMA etc. The first radio communication circuit 18 is in turn connected to a messaging unit 22 and to a voice communication unit 20. These units 20 and 22 are both able to use the first radio communication circuit 18 for transmitting voice and electronic messages, respectively. There is also a second radio communication circuit 26 connected to the antenna 16. The second radio communication circuit 26 is a wireless local area network (WLAN) communication circuit, i.e. a circuit operating according to IEEE 802.11. There is also a call handling unit 24 connected to the two radio communication circuits 18 and 26, to the messaging unit 22 and the voice communicating unit 20. Finally there is a contacts memory 28, which is connected to the call handling unit 24, the messaging unit 22 and to the voice communicating unit 20.

It should here be realized that it is possible for the messaging unit 22 and sometimes also the voice communication unit 20 to also employ the second radio communication circuit 26.

Figure 3:
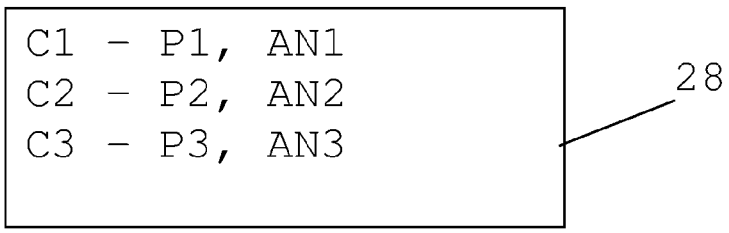

FIG. 3 shows exemplifying content of the contacts memory 28. The memory 28 comprises data for a number of contacts C1, C2 and C3. The contacts memory more particularly comprises a phone number of each of these contacts. A first contact C1 has a first phone number P1, a second contact C2 has a second phone number P2 and a third contact C3 has a third phone number P3. With each contact C1, C2 and C3 there is also associated an access number of the communication handling device 14. There is here a first access number AN1 linked to the first contact C1, a second access number AN2 linked to the second contact C2 and a third access number AN3 linked to the third contact C3.

Figure 4:
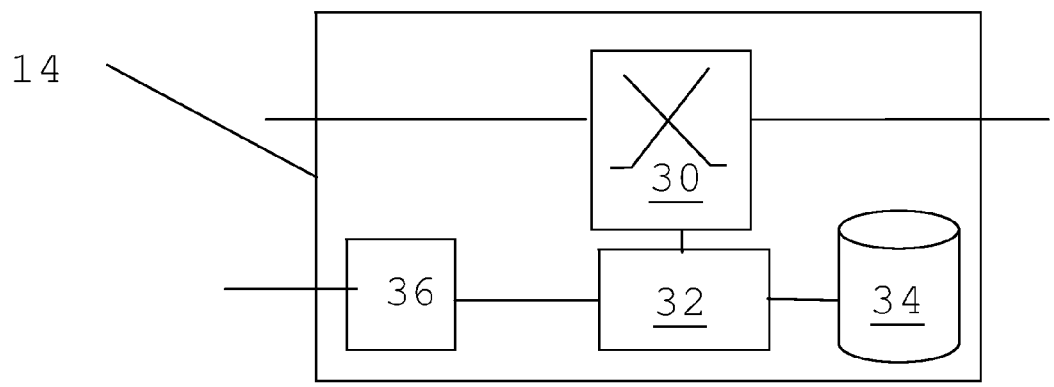
FIG. 4 shows a block schematic of units in the communication handling device, FIG. 5 schematically shows content of a mapping database of the communication handling device, FIG. 6 schematically shows a number of method steps being performed in a method of enabling the set-up of a call and being performed in the user terminal, and FIG. 7, schematically shows a number of method steps being performed in a method of performing call set-up and being performed in the communication handling device.

FIG. 4 shows a block schematic of the communication handling device 14. It includes a call interconnecting unit 30, for instance in the form of a PBX. The communication handling device 14 also comprises a control unit 32. The control unit 32 is connected to a mapping database 34, to the call interconnecting unit 30 and to a data communication interface 36.

Figure 5:
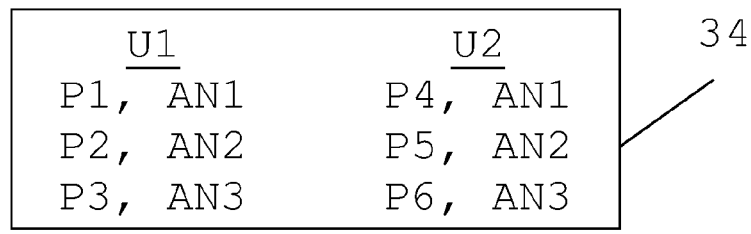

FIG. 5 schematically shows content of the mapping database 34. The communication handling device 14 has a group of access numbers, which group is here shown as comprising three access number AN1, AN2 and AN3. These access numbers are dedicated to a special purpose.

These access numbers are linked to the contacts of the different users or rather to the phone numbers of entities different users of the communication handling device 14 wish to phone. As an example there is a here a first user U1 and a second user U2. The first user U1 is the user of the mobile terminal 10 and the second user U2 is another user.

For the first user U1 there is a linking between the first phone number P1 and the first access number AN1, a linking between the second phone number P2 and the second access number AN2 and a linking between the third phone number P3 and the third access number AN3. There is thus a linking in the database between the phone numbers of the contacts of the first user U1 and the access numbers of the communication handling device 14.

In a similar manner the mapping database 34 comprises a linking between the contacts of a second user U2 and the same group of access numbers associated with the communication handling device 14. The database thus comprises a linking between a fourth phone number P4 and the first access number AN1, a linking between a fifth phone number P5 and the second access number AN2 and a linking between a sixth phone number P6 and the third access number AN3.

There is thus also a linking in the mapping database 34 between the phone numbers of the contacts of the second user U2 and the access numbers of the communication handling device 14.

It should be realized that it is possible that there are several more access numbers as well as several more users than what is shown in FIG. 5. However, the same group of access numbers are used for identifying different entities in relation to all users.

Figure 6:
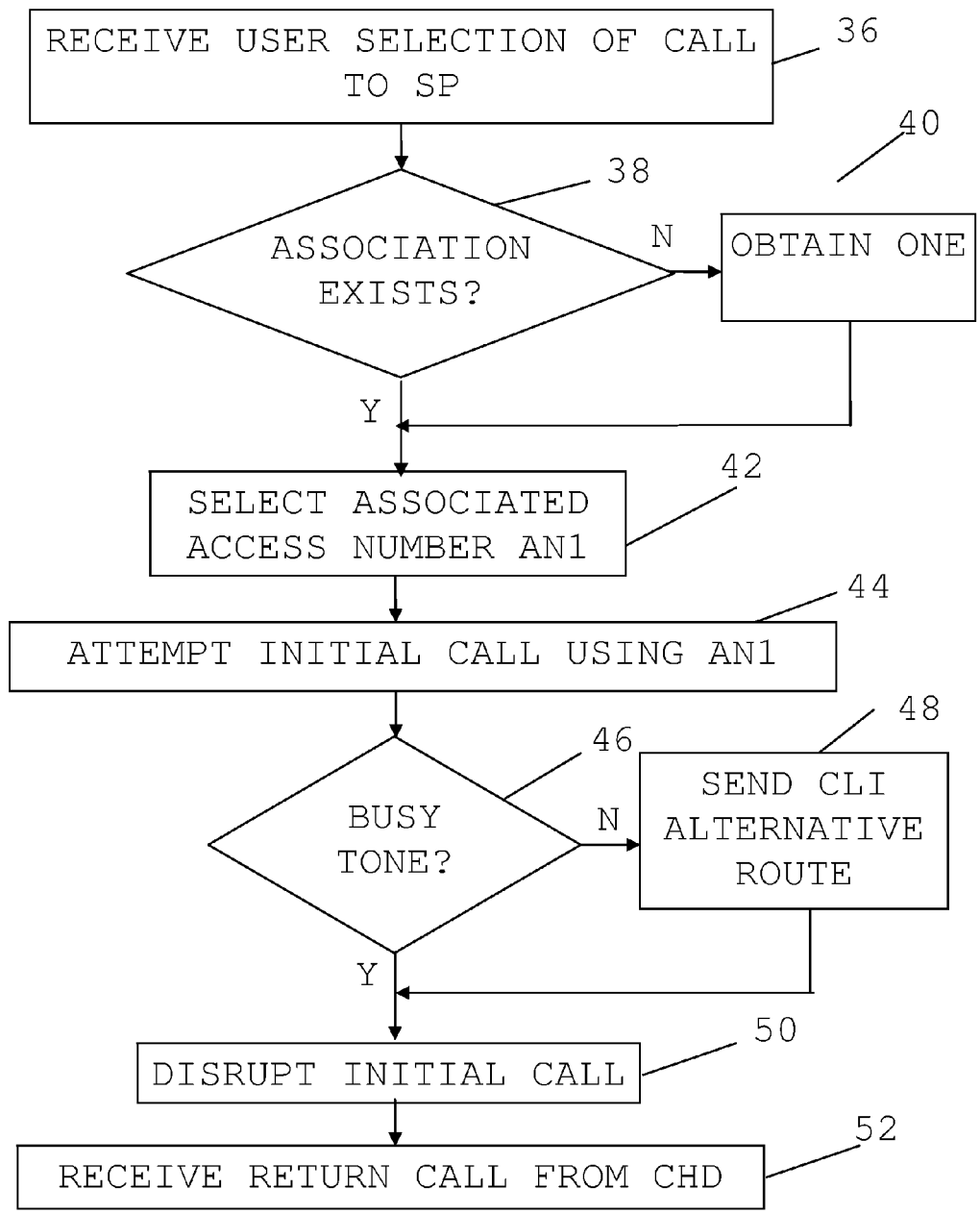
Figure 7:
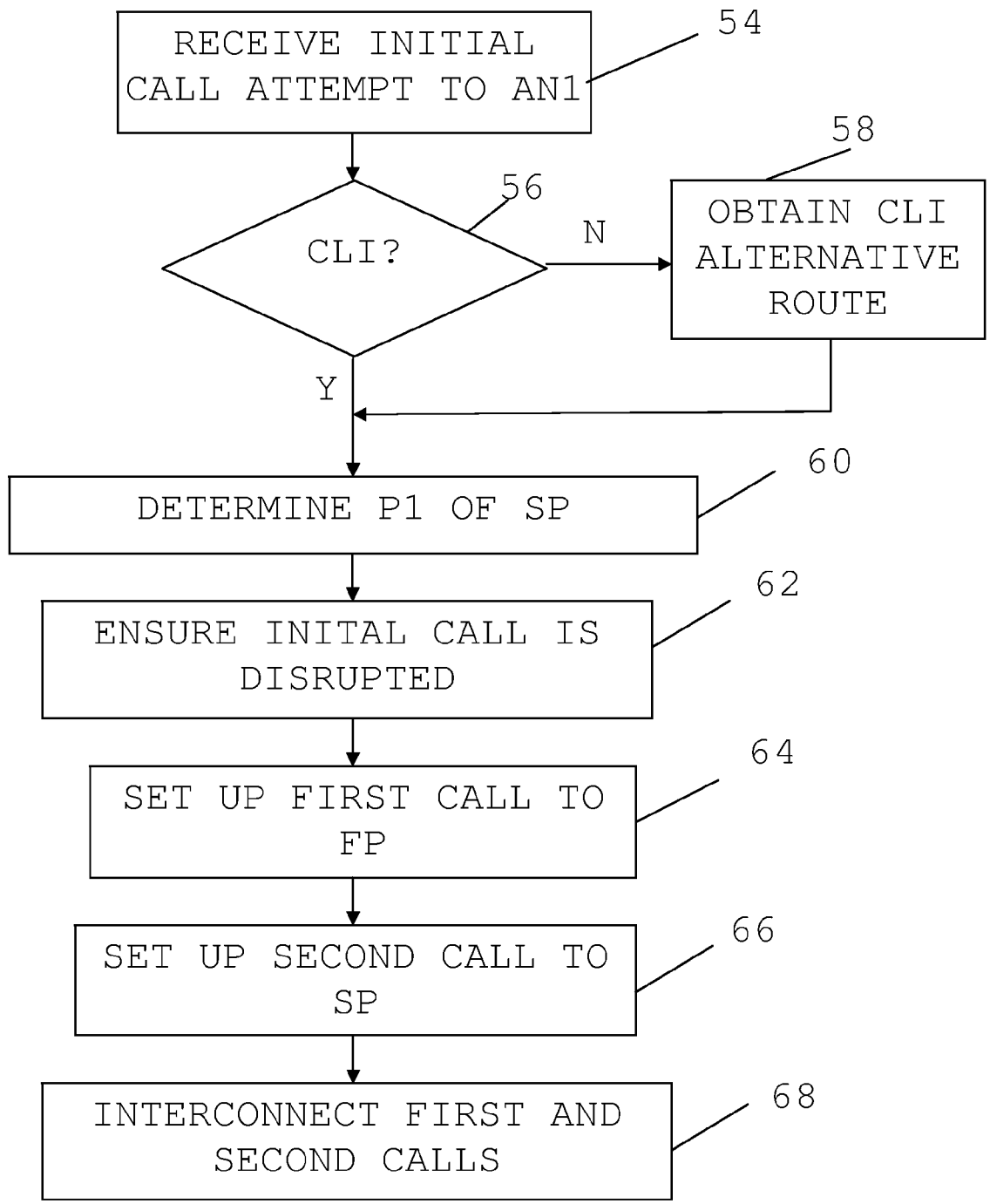

Now an embodiment of the invention will be described in relation to FIGS. 1-5 as well as to FIG. 6, which schematically shows method steps in a method of enabling the setting up of telephone calls for a user of a user terminal and being performed in the user terminal and to FIG. 6, which schematically shows a number of method steps in a method of setting up telephone calls for a user associated with a communication handling device and being performed in the communication handling device.

The user terminal 10 is in this embodiment associated with the communication handling device 14 in that one or more access numbers of the communication handling device 14 have been linked to the user terminal and more particularly to different entities or contacts, such as persons, with which the first user U1 of the user terminal 10 may want to communicate. The first user is further a first party FP and a person or entity the first user wishes to contact is a second party SP.

When the user terminal 10 is in a home network, which may be a network with which the user has a subscription, the contacts memory 28 may be regularly synchronized with the mapping database 34, which means that new contacts that are being added will be associated with an access number of the communication handling device 14 both in the contacts memory 28 and the mapping database 34. This synchronization may be performed via the home network of the user terminal, which is typically a mobile communication network.

The user terminal 10 may furthermore be roaming, i.e. be in another network than the home network. In this case the first network N1 is such a network in which the user terminal 10 roams. As was discussed earlier data traffic may be expensive in such a network and therefore it is possible that the above-mentioned synchronization via the first network N1 is disabled during roaming.

Furthermore, the first user U1 may in this situation desire to call a contact and may make a selection of this entity via a user input unit, such as via the display 12. Therefore the control unit 24 receives, via the user input unit, a selection of a call to a second party SP, step 36, which selection may be made through the first user U1 selecting a contact in the contacts memory 28.

The call handling unit 24 then investigates if there is an association between an access number in the group of access numbers of the communication handling device 14 and the second party SP. This may be done through investigating if there is such an access number associated with the second party SP in the contacts memory 28.

If no such association exists, step 38, then the call handling unit 24 obtains one using the second network N2, step 40. It may do this through making the second radio communication circuit 26 connect to the control unit 32 of the communication handling device 14 via the antenna 16 and data communication interface 36. In this case an identifier of the first user U1 and the phone number of the second party SP may be transferred via the second network N2, where the control unit 32 associates this phone number of the second party with an access number in the group in relation to the first user U1. The access number is then sent to the call handling unit 24 via the same route, i.e. using the second network N2. Thereafter the call handling unit 24 stores the access number in the contacts memory 28 associated with contact that is the intended second party SP. The use of the second network N2 may be free of charge, and therefore this data may be transmitted without any cost. In case no second network N2 is in range of the user terminal 10, the user U1 may be informed about this situation and suggested to move to the closest wireless local area network in order to allow the association to be performed.

If an association exists, step 38, or after the access number has been obtained via the second network N2, step 40, the call handling unit 24 selects the associated access number, step 42. It thus selects the access number associated with the second party SP. In this example the second party SP may be the first contact C1 and therefore the access number may be the first access number AN1.

Thereafter the call handling unit 24 connects to the voice communication unit 20 and makes it attempt to set up an initial telephone call to the communication handling device 14 via the antenna 16 and first communication network N1, step 44. This call is furthermore set up using the first access number AN1. Most mobile communication networks will add a calling party identifier CLI to the attempt, which may be the phone number or B-number of the user terminal. In this case the access number AN1 is thus used as an A-number and the phone number of the user terminal 10 as a B-number.

The initial call attempt is then received by the call interconnecting unit 30, which in turn informs the control unit 32 about the attempt that used the first access number AN1 and if there is a calling party identifier also about this calling party identifier, step 54.

The control unit 32 then investigates if there is a calling party identifier.

If there is not, step 56, which may happen in some networks, then the calling party identifier or any type of identifier identifying the first user U1 is obtained vi an alternative route, step 58.

After having obtained an identifier via an alternative route, step 58, or if there is a calling party identifier in the initial call attempt, step 56, the control unit 32 determines the phone number P1 of the second party SP, step 60. This determination is done based on the calling party identifier and the first access number AN1. This may more particularly be done through first identifying the first user U1, which is done through investigating the calling party identifier. Thereafter the control unit 24 investigates which phone number has been associated with the first access number AN1 for this first user U1 in the mapping database 34. In this example it finds that the first phone number P1 is associated with the first access number AN1 for the first user U1.

Thereafter the control unit 32 ensures that the initiating call is disrupted, step 62. It thus triggers the disruption of the initiating or initial call. In case the initial call comprised a calling party identifier, then the ensuring is an ensuring that the call set up is never completed. It may thus be an ensuring that the attempted call set up fails. The ensuring may be carried put through sending a trigger to the user terminal to disrupt the initiating call. This may be done through making the call interconnecting unit 30 emit a busy tone to the user terminal 10. The same procedure may also be used for some of the alternative routes mentioned above.

After the initial call has been disrupted, the control unit 32 then goes on and orders the call interconnecting unit 30 to place or set up a first telephone call to the first party FP, i.e. to the user terminal 10, step 64, as well as a second telephone call to the second party SP, step 66, and thereafter order the call interconnecting unit 30 to interconnect the two calls, step 68. Here it is possible that the second telephone call is set up first and that the first telephone call is set up afterwards. The first telephone call may for instance be set up after receiving confirmation of the second telephone call being successfully initiated, such as based on a ring tone being emitted to the second party or the second party going off hook.

After the call handling unit 24 of the user terminal 10 has made sure that the initial call is attempted, it then awaits information that the communication handling device has ensured a disruption, for instance through receiving a trigger to disrupt, as an example in the form of a busy tone. Thus, if a busy tone is received by the voice communication unit 20, step 46, the call handling unit 24 then makes the voice communication unit 20 disrupt the initial call, step 50, for instance through putting the phone on hook based on the reception of the busy tone. After this the above mentioned return call is then received by the voice communication unit 20, step 52. However, if no information about an ensured disruption is received, such as if no busy tone is received within a time out period, step 46, then the call handling unit 24 sends the calling party identifier via an alternative route, step 48, disrupts the initial call, step 50, and thereafter receives the return call from the communication handling device step 52.

During all this the call handling unit 24 furthermore hides some of the activities for the user. Here it hides the call set up activities. The user may only be informed that a call is being placed to the second party.

In this way it is possible for the first party FP to make telephone calls to the second party SP, where the costs of the calls are being taken by the communication handling device 14. Since the initial call is disabled before being established there are no costs involved with this call. The user terminal will also not have to send any data messages through the first network N1. This may especially be of interest when the user terminal is roaming, where all activities of the user terminal in the first network, including sending of data messages, may be expensive. It may also be of interest from a fairness perspective, when the user terminal is the private property of the first user, which is making a business call that should be paid by the employee.

As was mentioned above in some exceptional cases, the first network N1 may not employ calling party identifiers, in which case it is impossible to identify the first party by the communication handling device 14.

There are a number of ways in which this may be handled.

If there is no calling party identifier, the communication handling device 14 may accept the initial call, the set up of which is completed and the initial call thereby established. Thereafter the call handling unit 24 may transfer the missing identifier to the communication handling device 14 via this initial call. The calling party identifier may be transferred as coding of the audio, for instance through making the voice communication unit 20 use DTMF (Dual Tone Multi-Frequency. The control unit 32 of the communication handling device 14 may then ensure that the initial call is disrupted as soon as the code has been received, for instance through making the call interconnecting unit 30 end the call after the code has been received, which also disrupts the call in the user terminal 10.

It is possible that the initial call is disrupted in the same way as when there is calling party identifier. The communication handling device 14 may for instance emit a busy tone as a response to a time out or the user terminal 10 may go on-hook after the time out and thereby the set-up of the initial call is never completed. After the initial call set-up is thus disrupted, the call handling unit 24 may connect to the messaging unit 22 and order it to send an electronic message to the communication handling device 14, which message may then comprise the calling party identifier. The message may be sent as an SMS or MMS in the first network N1. However, if there is a WiFi connection to the second network N2, then the message may just as well be sent as an e-mail in this network. After the calling party identifier has been received, the communication handling device 14 then sets up the two calls and interconnects them in the previously described way.

It should be realized that the obtaining of an access number via the second network as described above is optional. Also the handling of the lack of use of calling party identifiers may be optional. It is in this case possible that a call is set up regularly, i.e. directly between the two parties, in case the communication handling device cannot be used.

The call handling unit, the messaging unit and the voice communication unit of the user terminal may be provided in the form of software installed in the user terminal. However, in other variations of the invention the call handling unit may be provided through a web browser using a set of data including control instructions, such as an HyperText Markup Language (HTML) page in which control instructions are embedded. The control instructions can be set for accepting data and invoking the messaging unit 22 and voice communication unit 20. Such a web page may be obtained from a web site of the communication handling device.

The call handling unit may thus be provided as a set of data downloadable from a server, such as in the form of a web page on this server. However, it can also be provided in the form of for instance a client program, which may be downloaded from a server and then installed on the user terminal. The call handling unit, messaging unit and voice communicating unit may thus all be provided as software, which implements these units when being run by a processor in the user terminal. Such a computer program may also be provided on a data carrier such as a memory stick or CD Rom disc which can be connected to the user terminal and the program code loaded onto the user terminal therefrom. The call handling unit, messaging unit and voice communicating unit can finally also be provided in the form a circuit or a part of a circuit mounted in the user terminal.

It should here be realized that also the control unit of the communication handling device may be provided in the form of software, which implements the control unit when being run by a processor in the communication handling device. Such a computer program may also be provided on a data carrier such as a memory stick or CD Rom disc which can be connected to the communication handling device and the program code loaded onto the communication handling device therefrom.

The invention claimed is:

1. A method of enabling the setting up of telephone calls for a user (U1) of a user terminal, said user being a first party (FP) associated with a communication handling device, the method being performed in a call handling unit of the user terminal and comprising:
the user terminal receiving, from the first party, a user selection of a second party (SP) with which the first party desires to communicate;
the user terminal determining that an association exists between a first access number (AN1) belonging to the communication handling device and the second party, where the first access number is a number in a group of access numbers used for identifying different entities in relation to several users;
the user terminal attempting to set up an initial telephone call from said user terminal to the communication handling device using said first access number;
the user terminal disrupting the initial telephone call based on an ensuring by the communication handling device that the establishment is not completed; and
the user terminal receiving a return call from the communication handling device, where said return call is a first telephone call between said terminal and the communication handling device being interconnected in the communication handling device with a second telephone call between the communication handling device and the terminal of the second party, where the second party has been selected by the communication handling device based on the first access number and a calling party identifier of the first party.

2. The method according to claim 1, further comprising:
the user terminal receiving a busy tone from the communication handling device indicating that the calling party identifier has been comprised of the attempt to set up the initial telephone call; and
in response to the busy tone, the user terminal disrupting the set up of the initial call before being established.

3. The method according to claim 2, wherein if no busy tone is received by the user terminal within a specified time period, the method further comprises:
the user terminal transferring said calling party identifier coded into the audio of said initial telephone call; and
the user terminal disrupting the initial telephone call.

4. The method according to claim 2, wherein the disrupting comprises disrupting the set up of the initial telephone call before being established, and the method further comprises, if no busy tone is received within a time period, the user terminal sending an electronic message to the communication handling device, said message comprising said calling party identifier.

5. The method according to claim 1, wherein if there is no first access number (AN1) associated with the user, the method further comprises the user terminal connecting to the communication handling device using a wireless local area network connection, in order to obtain the first access number.

6. The method according to claim 1, wherein if there is no first access number (AN1) associated with the user, the method further comprises:
the user terminal setting up an inquiring telephone call to the communication handling device using a general access number of the communication handling device;
the user terminal conveying a telephone number of the second party via the inquiring telephone call
the user terminal receiving n electronic message with the first access number; and
the user terminal associating the first access number with the telephone number of the second party.

7. A user terminal of a user being a first party (FP) associated with a communication handling device, the user terminal comprising:
- a memory;
- a processor; and
- a non-transitory computer-readable storage medium storing instructions that, when executed on the processor, cause the user terminal to implement a voice communicating unit, and a call handling unit configured to:
- receive a user selection of a second party (SP) with which the first party desires to communicate;
- determine that an association exists between a first access number (AN1) belonging to the communication handling device and the second party, where the first access number is a number in a group of access numbers used for identifying different entities in relation to several users;
- controlling the voice communicating unit to attempt to set up an initial telephone call from said user terminal to the communication handling device using said first access number;
- disrupting the initial telephone call based on an ensuring by the communication handling device that the establishment is not completed; and
- receive a return call from the communication handling device, where said return call is a first telephone call between said user terminal and the communication handling device being interconnected in the communication. handling device with a second telephone call between the communication handling device and the terminal of the second party, where the second party has been selected by the communication handling device based on the first access number and a calling party identifier of the first party.

8. A computer program product for enabling the setting up of telephone calls for a user (U1) of a user terminal, said user being a first party (FP) associated with a communication handling device, the computer program product comprising computer program code embodied on a non-transitory computer-readable storage medium that, when executed on the user terminal, cause the user terminal to:
- receive a user selection of a second party (SP) with which the first party desires to communicate;
- determine that an association exists between a first access number (AN1) belonging to the communication handling device and the second party, where the first access number is a number in a group of access numbers used for identifying different entities in relation to several users;
- attempting to set up an initial telephone call from said user terminal to the communication handling device using said first access number;
- disrupting the initial telephone call based on an ensuring by the communication handling device that the establishment is not completed; and
- receiving a return call from the communication handling device, where said return call is a first telephone call between said user terminal and the communication handling device being interconnected in the communication handling device with a second telephone call between the communication handling device and the terminal of the second party, where the second party has been selected by the communication handling device based on the first access number and a calling party identifier of the first party.

9. A method of setting up telephone calls for a user (U1), said user being a first party (FP) associated with a communication handling device, where the communication handling device has access to at least one communication network (N1, N2) and being provided with a group of access numbers used for identifying different entities in relation to several users, the method being performed by the communication handling device and comprising:
- the communication handling device receiving, from the first party (FP), an attempt to establish an initial telephone call to a first access number (AN1), said first access number being a number in the group;
- the communication handling device determining that the attempt comprises a calling a party identifier;
- the communication handling device ensuring that the establishment of the initial telephone call to the first access number is not completed; and
- the communication handling device performing a call handling routine comprising the steps:
  - locating a second party with which the first party desires to communicate based on the first access number and the calling party identifier,
  - setting up a first telephone call to a terminal of the first party,
  - setting up a second telephone call to the terminal of the second party, and
  - interconnecting the first and the second telephone call.

10. The method according to claim 9, further comprising:
- the communication handling device receiving, from the first party, an inquiring telephone call to a general access number;
- the communication handling device receiving a telephone number of the second party via the inquiring telephone call;
- the communication handling device associating the telephone number of the second party with the first access number; and
- the communication handling device sending an electronic message with the first access number to the first party.

11. The method according to claim 9, wherein if no calling party identifier is received within a time out period, the method further comprises:
- the communication handling device accepting the initial telephone call from the first party;
- the communication handling device receiving a calling party identifier coded into the audio of this initial telephone call;
- the communication handling device ensuring that the initial telephone call is ended after the reception of the calling party identifier; and
- the communication handling device performing the call handling routine.

12. The method according to claim 9, wherein if no calling party identifier is received within a time out period, the method further comprises:
- the communication handling device ensuring that the establishment of the initial telephone call to the first access number is not completed;
- the communication handling device receiving the calling party identifier via a message sent from the first party; and
- the communication handling device performing the call handling routine.

13. A communication handling device for a user (U1) being a first party associated with a communication handling device, where the communication handling device has access to at least one communication network (N1, N2) and is provided with a group of access numbers used for identifying different entities in relation to several users, the communication handling device comprising:
- a memory;
- a processor; and
- a non-transitory computer-readable storage medium storing instructions that, when executed on the processor, cause the communication handling device to implement:
- a call interconnecting unit configured to receive, from the first party (FP), an attempt to establish an initial telephone call to a first access number (AN1), said first access number being a number in the group; and
- a control unit configured to:
  - determine that the attempt comprises a calling party identifier,
  - ensure that the establishment of the initial telephone call to the first access number is not completed, and
  - perform a call handling routine comprising:
    - locating a second party (SP) with which the first party desires to communicate based on the first access number and the calling party identifier, and
    - order the call interconnecting unit to set up a first telephone call to a terminal of the first party, set up a second telephone call to the terminal of the second party, and interconnect the first and the second telephone call.

14. A computer program product for setting up telephone calls for a user (U1), said user being a first party (FP) associated with a communication handling device, where the communication handling device has access to at least one communication network (N1, N2) and being provided with a group of access numbers used for identifying different entities in relation to several users, the computer program product comprising computer program code embodied on a non-transitory computer-readable storage medium that, when executed on the communication handling device, cause the communication handling device to:
- receive, from the first party (FP), an attempt to establish an initial telephone call to a first access number (AN1), said first access number being a number in the group;
- determine that the attempt comprises a calling party identifier;
- ensure that the establishment of the initial telephone call to the first access number is completed; and
- performing a call handling routine comprising:
  - locating a second party with which the first party desires to communicate based on the first access number and the calling party identifier,
  - ordering the setting up a first telephone call to a terminal of the first party,
  - ordering the setting up a second telephone call to the terminal of the second party, and
  - ordering an interconnection the first and the second telephone call.

* * * * *